(12) United States Patent
Underhill

(10) Patent No.: US 10,371,106 B2
(45) Date of Patent: Aug. 6, 2019

(54) BLOW-OUT ROTARY SCREEN CLEANER

(71) Applicant: CNH Industrial America LLC, New Holland, PA (US)

(72) Inventor: Kenneth R. Underhill, Strasburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 94 days.

(21) Appl. No.: 15/468,700

(22) Filed: Mar. 24, 2017

(65) Prior Publication Data

US 2018/0274500 A1 Sep. 27, 2018

(51) Int. Cl.
| | |
|---|---|
| *B01D 46/00* | (2006.01) |
| *F02M 35/08* | (2006.01) |
| *F02M 35/024* | (2006.01) |
| *B01D 46/10* | (2006.01) |

(52) U.S. Cl.
CPC ....... *F02M 35/086* (2013.01); *B01D 46/0056* (2013.01); *B01D 46/0067* (2013.01); *B01D 46/10* (2013.01); *F02M 35/02416* (2013.01); *B01D 2279/60* (2013.01)

(58) Field of Classification Search
CPC .......... F02M 35/02416; F02M 35/086; B01D 46/00; B01D 46/0042; B01D 46/0056; B01D 46/0057; B01D 2279/60
USPC .................................................. 55/282–305
See application file for complete search history.

(56) References Cited

U.S. PATENT DOCUMENTS

| | | | |
|---|---|---|---|
| 3,499,267 A | | 3/1970 | King, Jr. et al. |
| 4,153,436 A | * | 5/1979 | Cozine ................... B01D 46/26 55/290 |
| 4,364,755 A | * | 12/1982 | Ferri .................. B01D 46/0065 55/290 |
| 4,377,401 A | | 3/1983 | Laughlin |
| 4,481,021 A | * | 11/1984 | Kinney, Jr. ............ B01D 46/26 210/402 |
| 4,542,785 A | | 9/1985 | Bagnall et al. |
| 4,874,411 A | | 10/1989 | Snauwaert et al. |
| 4,971,026 A | * | 11/1990 | Fineblum ................ F23D 14/68 126/110 R |
| 5,565,012 A | | 10/1996 | Buodd |
| 5,958,093 A | | 9/1999 | Nani et al. |
| 7,998,245 B2 | | 8/2011 | Demonie et al. |
| 8,978,802 B2 | | 3/2015 | Ricketts |
| 2010/0242423 A1 | * | 9/2010 | Morgan ............ B01D 46/0005 55/483 |

FOREIGN PATENT DOCUMENTS

GB 1425464 2/1976

* cited by examiner

*Primary Examiner* — T. Bennett McKenzie
(74) *Attorney, Agent, or Firm* — Peter K. Zacharias; Patrick M. Sheldrake

(57) ABSTRACT

An intake air distribution system for removing contamination from an air filter screen includes walls defining an interior space. The intake air distribution system includes an air blower positioned within the interior space of the air filter screen. The air blower includes an inlet positioned to draw air in through the air filter screen and an outlet through which air is exhausted from the blower. A manifold is connected to the outlet of the blower for directing air onto the walls of the air filter screen and out through the air filter screen.

15 Claims, 4 Drawing Sheets

BLOW-OUT ROTARY SCREEN CLEANER

FIELD OF THE INVENTION

The present invention relates to the cleaning of an air intake filter screen of an agricultural machine, such as a harvester combine.

BACKGROUND OF THE INVENTION

As described in U.S. Pat. No. 8,978,802 to CNH America LLC, which is incorporated by reference herein in its entirety, agricultural work vehicles, such as a harvester combine, are typically powered by an internal combustion engine located in an engine compartment, which isolates the engine from the relatively dirty work environment. The internal combustion engine requires a relatively clean source of engine combustion air and cooling air that must be drawn from ambient air around the vehicle. The harvesting process, however, generates a significant amount of airborne particulates, including dust, dirt, and the like. MOG (material other than grain) is separated from the harvested grain and is typically blown out from the processing equipment and spread on the ground behind the vehicle as chaff. This process of spreading chaff is possibly the greatest contributor to the relatively dirty ambient air around the vehicle. With the unavoidable amount of airborne matter in the ambient air, it can be difficult to draw and supply the clean air needed by the engine.

Conventional combines draw ambient air from along the side of the vehicle with an engine fan. The air is drawn through a rotary air screen that provides an initial degree of cleaning. A portion of the air drawn through the rotary screen is directed through heat exchangers (e.g., radiator, charge air cooler, hydraulic system cooler, and so forth), while another portion of the air is further cleansed in an engine air filter and directed to the engine intake manifold for combustion air. Because the air is initially drawn from perhaps the dirtiest air around the vehicle, the rotary screen and engine air filter require frequent cleaning and maintenance.

A vacuum system may be configured with the rotary screen to vacuum particulate matter from the screen as it rotates. Such vacuum systems typically draw the particulate matter off of the screen and into the air ducts toward the engine cooling fan. The engine cooling fan then distributes the particulate matter over the engine, which can degrade engine performance.

What is sought in the industry is an improved air intake configuration that will initially supply relatively clean air for engine combustion and component cooling as compared to conventional designs.

SUMMARY OF THE INVENTION

According to one embodiment of the invention, an intake air distribution system for removing contamination from an air filter screen includes walls defining an interior space. The intake air distribution system includes an air blower positioned within the interior space of the air filter screen. The air blower includes an inlet positioned to draw air in through the air filter screen and an outlet through which air is exhausted from the blower. A manifold extends from the outlet of the blower for directing air onto the walls of the air filter screen and out through the air filter screen.

In another embodiment, an intake air distribution system for an agricultural vehicle includes an air filter screen having walls defining an interior space. The walls of the air filter screen includes a circular wall defining a longitudinal axis and a side wall extending from a circumference of the circular wall. The side wall of the air filter screen includes an undulating portion. An air blower is positioned within the interior space of the air filter screen. The air blower includes an inlet positioned adjacent the circular wall of the air filter screen to draw air in through the air filter screen and an outlet through which air is exhausted from the blower. A manifold extends from the outlet of the blower for directing air onto the walls of the air filter screen and out through the air filter screen thereby removing contamination from the air filter screen.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

In general, aspects of the present invention relate to a work vehicle, particularly agricultural work vehicles such as a harvester combine. It should be appreciated, however, that the invention is not limited to a combine, or any other particular type of work vehicle, and that the invention has usefulness for any vehicle wherein it is beneficial to provide a relatively clean source of engine compression and cooling air. Aspects of the invention are described herein with reference to a combine for illustrative purposes only.

Figure 1:
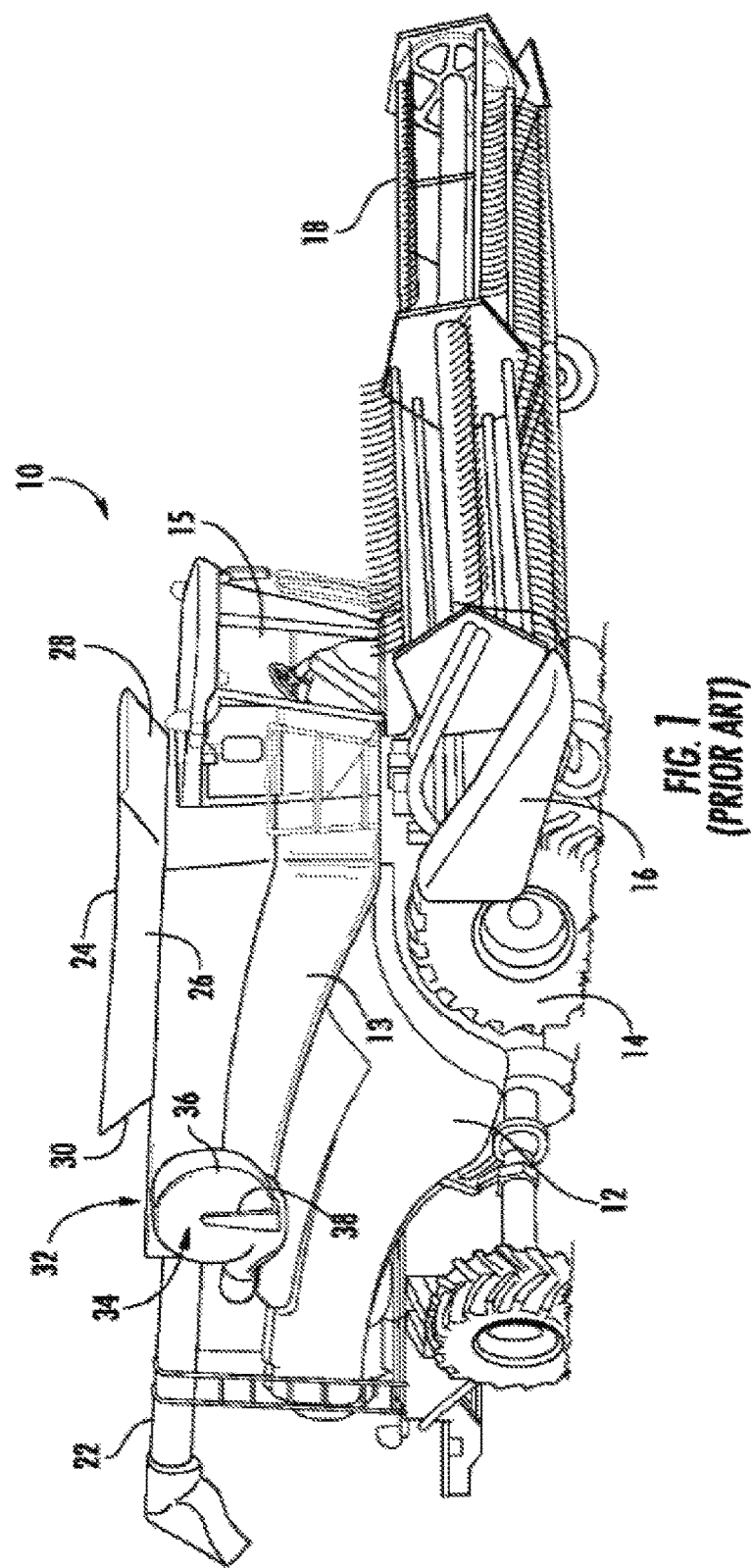
FIG. 1 depicts an agricultural work vehicle as a conventional combine harvester, according to the prior art.

Referring now to the drawings, wherein like numbers refer to generally like items or features, FIG. 1 depicts an agricultural work vehicle 10 as a conventional combine harvester for illustrative purposes only. The work vehicle 10 has a body 12 with sides 13 mounted on a frame (not visible). The body 12 and frame are supported on wheels 14 or other transport means, such as tracks. An operator's cab 15 is at the front of the vehicle 10. A feeder house 16 is configured on a front end of the combine 10 with a header 18 that serves to sever a swath of crops from a field as the combine 10 moves forward and to convey the severed crops to feeder house 16. The feeder house 16 includes an internal conveying system (not shown), for conveying the crops upwardly and rearwardly into the body of the combine 10 and into an inlet of an internal separating or threshing system for processing.

The threshing system generally includes a rotor at least partially enclosed in a concave structure in which the crop material is processed for separating grain and material other than grain (MOG) from straw, with the straw being ejected rearwardly from the threshing system through the rear end of the combine 10 for deposit on the field, as is well-known.

The harvested crop material is conveyed to a grain bin for subsequent unloading via an unload auger 22. An upwardly extending grain bin extension skirt 24 is configured above the grain bin and includes a front wall 28, longitudinally extending side walls 26 and a rear wall 30. The grain bin extension 24 extends above the vehicle sides 13 and cab 15, and may have outwardly sloped walls that define a generally trapezoidal shape.

The combine 10 includes an internal combustion engine housed within engine compartment 32 in the rear portion of the combine 10. The engine compartment 32 may be variously configured. In the illustrated embodiment, the compartment 32 is defined by a housing structure having panels mounted to the vehicle frame. In an alternate embodiment, the engine compartment 32 may be manufactured with the engine and mounted as an integral unit in the vehicle 10.

Internal combustion engines are well known and need not be described in great detail herein. Briefly, the engine includes combustion cylinders operably configured between an intake manifold and an exhaust manifold. The intake manifold receives combustion air via a duct in communication with an air inlet 34 (FIG. 1) in the body 12, for example in the body side 13. A turbocharger system may be utilized for providing compressed charge air to combustion cylinders. Exhaust gas is discharged from the cylinders to a muffler via an exhaust manifold.

In a typical configuration, a fan within the engine compartment 32 draws cooling ambient air through a radiator and charge air cooler. The radiator cools the liquid coolant circulated within the engine, and the charge air cooler cools the compressed and heated air which is discharged from the turbocharger. A rotary screen 36 may be configured in the vehicle side 13 over the inlet 34 at the upstream side of the radiator and the fan. The rotary screen 36 rotates during operation of the combine 10 to remove airborne particulates (e.g., chaff, straw, and the like) from the ambient air drawn through the radiator. A vacuum device 38 is used to vacuum the particulate matter from the outer surface of rotary screen 36 as the screen rotates past the vacuum. As noted in the Background section, the vacuum device 38 draws the particulate matter off of the screen 36 and into the air ducts toward the engine cooling fan. The engine cooling fan then distributes the particulate matter over the engine, which can degrade engine performance.

Figure 2:
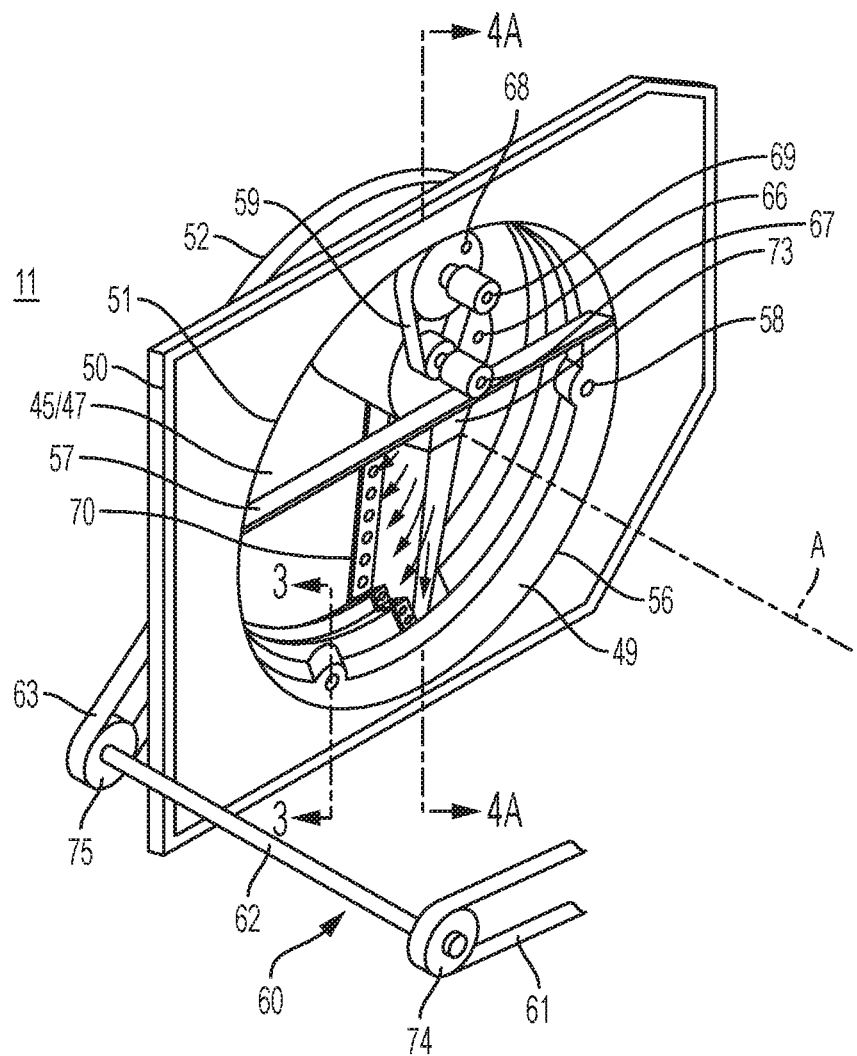
FIG. 2 is a schematic view of an exemplary air intake system.
Figure 3:
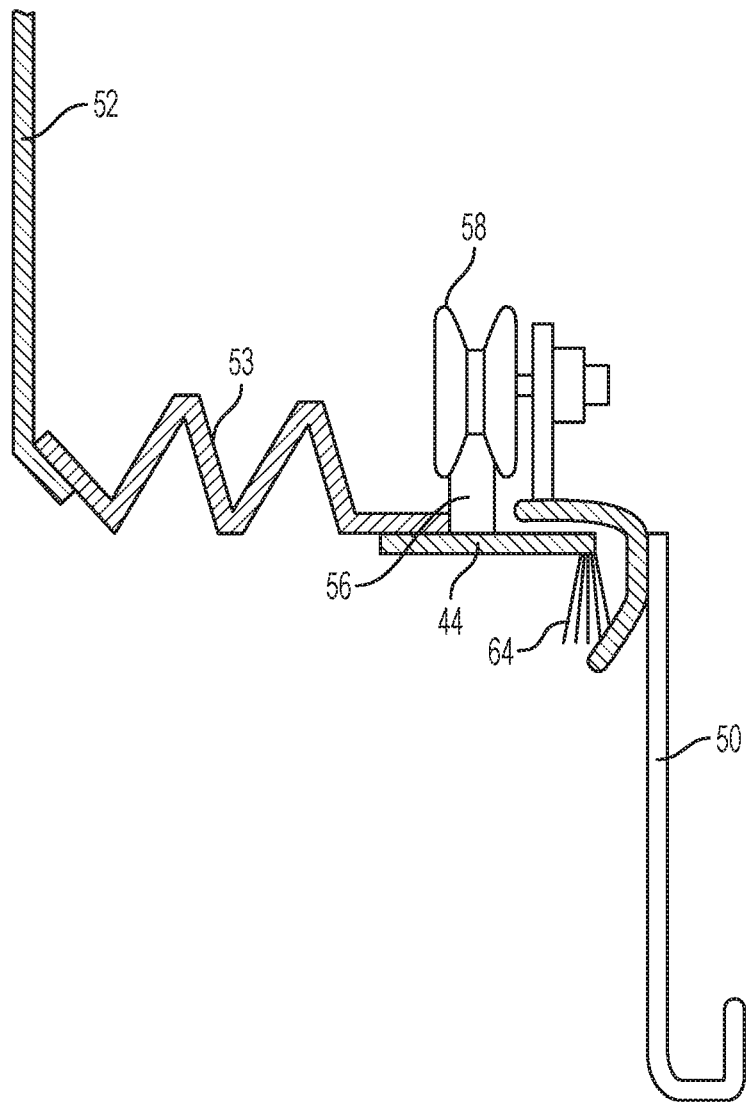
FIG. 3 is a cross-sectional view of the exemplary air intake system of FIG. 2 taken along the lines 3-3.

Turning now to the exemplary embodiment of the present invention shown in FIGS. 2-4B, FIG. 2 depicts a different intake air distribution system 11 for use with the vehicle 10 of FIG. 1. With the exception of the intake air distribution system 11, the other features of the vehicle 10 generally remain the same. The view of FIG. 2 is taken from the inside of the work vehicle 10 looking outwardly. In other words, with reference to FIG. 2, the belt 61 is positioned within the engine compartment whereas the belt 63 is positioned on outside of the vehicle 10. FIGS. 3 and 4A are cross-sectional views of the intake air distribution system of FIG. 2 taken along the lines 3-3 and 4A-4A, respectively.

In the intake air distribution system 11 of FIG. 2, a panel 50 is disposed on or adjacent the side 13 of the body 12 of the vehicle 10. The panel 50 provides access to internal feature of the work vehicle 10, such as the engine compartment 32. The panel 50 is preferably a door, however, it may also be a removable panel, or an immovable panel on the side 13 of the body 12.

An opening 51 is disposed in the panel 50 through which cooling air is delivered into the air intake system of the vehicle 10. The opening 51 defines the entrance 49 of the air inlet 34 that delivers air into the engine compartment 32 of the vehicle 10. One or more structural support beams 57, which are fixed to the panel 50, extend horizontally across the opening 51. A series of V-grooved guide rollers 58 are fixed to the panel 50 and are located uniformly about the circumference of the opening 51.

The intake air distribution system 11 includes a rotary screen 52, like the rotary screen 36 of FIG. 1. The rotary screen 52 serves as an air filter. Alternatively, a separate air filter may be mounted to the rotary screen 52.

The rotary screen 52 is rotatably mounted to the guide rollers 58 of the panel 50, and the rotary screen 52 rotates about axis A during operation of the vehicle 10. The guide rollers 58 spin about their own axes as the rotary screen 52 rotates about axis A. The rotary screen 52 includes perforations, openings or spaces through which air can freely travel, while larger particles are prevented from passing through the perforations.

The rotary screen 52 includes a plurality of walls 45 and 53 defining an interior space 47 having a substantially cylindrical shape. The walls 45 and 53 may be fixed together (as shown), or the walls may be formed from one unitary sheet of material. The front wall 45 is substantially circular. The side wall 53 depends from the front wall 45. The side wall 53 extends continuously about the circumference of the screen 52 and undulates in an axial direction (i.e., along axis A) between sharp crests and troughs. The number of crests and troughs may vary from that which is shown. The side wall 53 may be described as wavy, W-shaped, V-shaped or corrugated, for example.

By virtue of the undulating geometry of the side wall 53, the depth of the rotary screen 52 is reduced by approximately 120 millimeters as compared with various conventional rotary screens while offering substantially the same surface area through which air can travel.

As best shown in FIG. 3, the rotary screen 52 comprises components that are fixedly mounted together, namely, (i) the above-described perforated portion of the screen 52 comprising walls 45 and 53, (ii) an annular ring 44 mounted to the wall 53, and (iii) a V-ring 56 mounted to or extending from the annular ring 44. It should be understood that the V-ring 56, the annular ring 44 and the perforated portion of the rotary screen 52 rotate together. The sub-assembly of the solid V-ring 56 and annular ring 44 imparts structural integrity to the rotary screen 52, the remainder of which is perforated. The V-ring 56 and its annular ring 44 are mounted at the free end of the undulating wall 53, and they extend continuously about the circumference of the screen 52. As best shown in the detailed view of FIG. 4B, the terminal end of the V-ring 56, which extends inwardly toward axis A, includes a V-shaped engagement surface 46 for engaging a V-belt 59.

A brush 64 is mounted to the lower surface of the annular ring 44 for contacting the perimeter of the opening 51 of the panel 50 to either prevent or limit the entrance of contaminants into the engine compartment at the interface between the panel 50 and the rotary screen 52. Those skilled in the art will recognize that the brush 64 may be replaced by another device, such as a gasket, for performing the same function.

Referring now to FIG. 2, a screen drive system 60 is configured to rotate the rotary screen 52 about axis A and, also, indirectly power the blower 66, as will be described hereinafter. The screen drive system 60 includes a belt 61, which may be indirectly connected to the engine of the work vehicle 10, a power take off shaft, or a separate motor, for example. The belt 61 is attached to a pulley 74 at one end of a shaft 62 for spinning the shaft 62. A screen belt 63 is attached to the pulley 75 at the other end of the shaft for rotating the screen 52 about axis A.

The screen belt 63 may have a V-shape in cross-section and may be positioned within one or more of the V-shaped grooves formed in the side wall 53 of the rotary screen 52. Alternatively, the screen belt 63 may be attached to a pulley (not shown) at the center of the rotary screen 52 for rotating the screen 52 about axis A. Those skilled in the art will recognize that a variety of ways exist for rotating the screen 52 about axis A, and the invention is not limited to the screen drive system 60 that is shown and described herein.

The squirrel cage air blower 66 (blower 66 hereinafter) is fixedly mounted to the structural support beams 57 of the panel 50. The blower 66, along with its inlet and outlet, are positioned on the interior side of the screen 52, i.e., the side of the screen 52 that faces toward the engine compartment of the vehicle 10. More particularly, the blower 66 is entirely positioned within the interior space 47 of the screen 52. In contrast, the vacuum 38 of FIG. 1 is positioned on the outside of the screen 36.

An air inlet 65 of the blower 66 is positioned adjacent the interior facing side of the wall 45 of the rotary screen 52, and an air outlet 73 of the blower 66 is positioned to face downward in a direction facing the ground. Positioning the air inlet 65 on only one side of the blower 66 helps to reduce backflow pressure produced by the fan of the engine.

A jackshaft 69 is journaled in a bearing that is mounted to either the housing of the blower 66 or one of the structural support beams 57 of the panel 50. The jackshaft 69 is capable of rotation about its axis of rotation. A large pulley 68 is mounted to the jackshaft 69. A small pulley 67 is mounted to an input shaft of the blower 66. The large pulley 68, the small pulley 67 and the V-ring 56, are dynamically interconnected by the V-belt 59. More particularly, as best shown in the detailed view of FIG. 4B, the V-belt 59 is wound around both large pulley 68 and the small pulley 67. The V-belt 59 is also sandwiched between the V-ring 56 and the large pulley 68.

In operation, rotation of the rotary screen 52 and its V-ring 56 is imparted to the V-belt 59, which rotation is imparted to the large pulley 68, which rotation is also imparted to the small pulley 67 by way of the V-belt 59. This setup may be referred to in the art as a friction drive system. The input shaft of the blower 66, which is either connected to or forms part of the small pulley 67, rotates along with the small pulley 67. This provides the motive force to the blower 66. Stated differently, rotation of the belt 61 causes rotation of the shaft 62, which causes rotation of the belt 63, which causes rotation of the rotary screen 52 and its V-ring 56, which causes rotation of the V-belt 59, which causes rotation of both the large pulley 68 and the small pulley 67, which results in rotation of the input shaft of the blower 66, which results in operation of the blower 66.

As an alternative to the aforementioned friction drive system comprising belts and pulleys for rotating the input shaft of the blower 66, it is noted that the blower 66 may simply be powered by a separate hydraulic motor or other device.

A manifold 70 extends from the outlet 73 of the blower 66. The manifold 70 may be a separate component that is fixedly connected to the blower 66, or, alternatively, the manifold 70 may be integrated with the blower 66. The manifold 70 extends radially across a portion of the opening 51. The manifold 70 includes a plurality of sidewalls 76 defining a hollow interior. The lowermost sidewall 76a of the manifold 70 has an undulating W-shaped surface that compliments the W-shape of the sidewall 53 of the screen 52. The sidewall 76b (shown in FIG. 4A) of the manifold 70 is omitted in FIG. 2 to reveal the hollow interior of the manifold 70. It should be understood that neither the manifold 70 nor the blower 66 (with the exception of the input shaft of the blower) rotate along with the rotary screen 52.

Figure 4A:
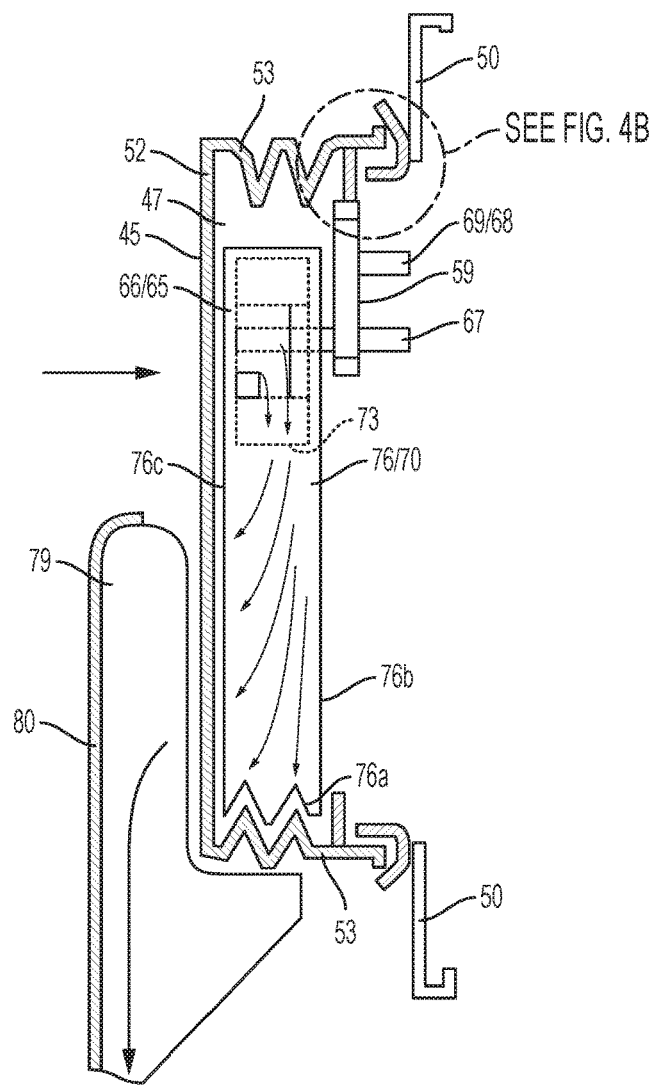
FIG. 4A is a cross-sectional view of the exemplary air intake system of FIG. 2 taken along the lines 4A-4A.
Figure 4B:
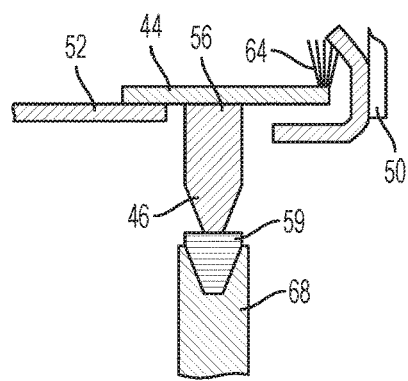
FIG. 4B is a detailed view of the exemplary air intake system of FIG. 4A.

As best shown in FIG. 4A, the lowermost sidewall 76a of the manifold 70 is positioned in close proximity and is interlaced with the sidewall 53 of the screen 52, such that a crest formed in the sidewall 53 is aligned with a trough of the sidewall 76a and a trough of sidewall 53 is aligned with a crest of the sidewall 76a.

The sidewalls 76a and 76c of the manifold 70, which directly face the rotary screen 52, include perforations for distributing air from the hollow interior of the manifold 70 and onto the rotary screen 52. The remaining sidewalls 76 of the manifold 70 may not include perforations. According to a different embodiment of the invention, every side wall 76 of the manifold 70 includes perforations.

The internal surfaces of the sidewalls 76 include fins for directing the air towards the sidewalls 76a and 76c and/or other areas of the manifold 70.

In operation, air is distributed from the outlet 73 of the blower 66 and into the manifold 70. Blowing air onto the rotary screen 52 dislodges contaminants from the screen 52, and those contaminants become entrained in the air flow (depicted by arrows in FIG. 4A) and are channeled into a passage 79 formed between the rotary screen 52 and a shield 80 on the exterior of the vehicle 10. The contaminants entrained in the air flow travel downward through the channel 79 and are expelled onto the ground beneath the vehicle 10. Unlike the vacuum devices of the prior art, the contaminants are not expelled into the engine compartment.

The blower 66 serves as both a vacuum and a blower. In other words, the blower 66 serves as a vacuum as it draws air through the wall 45 of the rotary screen 52 thereby dislodging contaminants from the rotary screen 52. And, the blower 66 and the manifold 70 serve as a blower as they exhaust that air through the walls 45 and 53 of the rotary screen 52 to a location outside of the vehicle. As noted above, blowing air onto the rotary screen 52 dislodges contaminants from the screen 52. Stated differently, the blower 66 both draws and exhaust air through the screen 52 in an effort to dislodge contaminants from the rotary screen 52.

The intake air distribution system 11 is specially configured to channel the air to the engine compartment while limiting contaminants (dirt, dust, chaff, etc.) from being delivered into the engine compartment and onto the engine. Also, by virtue of the intake air distribution system 11, a separate chaff exhaust ductwork, which can be found in many existing combine harvesters, can be omitted. By omitting separate chaff exhaust ductwork, air flow to the engine is greatly increased, and, the full cooling potential of the engine fan of the vehicle 10 can be realized.

The intake air distribution system 11 can be retrofitted onto many existing combine harvesters.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An intake air distribution system for removing contamination from an air filter screen having walls defining an interior space, the intake air distribution system comprising:
   an air blower positioned within the interior space of the air filter screen, the air blower including an inlet positioned to draw air in through the air filter screen and an outlet through which air is exhausted from the blower;
   a drive system for rotating the air filter screen relative to the manifold;
   a belt engaged between a first pulley and the air filter screen, wherein the drive system rotates the air filter screen which consequently rotates the belt, which causes rotation of the first pulley;
   a pulley belt;
   a second pulley either engaged to or extending from an input shaft of the blower, the second pulley being attached to the first pulley by the pulley belt such that rotation of the first pulley causes rotation of the second pulley, and rotation of the second pulley results in rotation of the input shaft of the blower, which causes air to be distributed from the inlet to the outlet of the blower; and
   a manifold extending from the outlet of the blower for directing air onto the walls of the air filter screen and out through the air filter screen.

2. The intake air distribution system of claim 1 further comprising a panel to which the air filter screen is rotatably mounted.

3. The intake air distribution system of claim 2 further comprising a guide roller mounted to the panel, wherein the air filter screen is mounted to the guide roller such that the air filter screen can rotate on the guide roller.

4. The intake air distribution system of claim 1, wherein the first pulley includes a shaft that is rotatably mounted to either the blower or a panel to which the blower is either directly or indirectly mounted.

5. The intake air distribution system of claim 1, wherein the drive system includes a belt connected to the air filter screen for rotating the screen relative to the manifold.

6. The intake air distribution system of claim 1, wherein the walls of the air filter screen include a circular wall defining a longitudinal axis and a side wall extending from a circumference of the circular wall.

7. The intake air distribution system of claim 6, wherein the inlet of the blower is positioned adjacent the circular wall of the air filter screen.

8. The intake air distribution system of claim 6, wherein the side wall of the air filter screen includes an undulating portion.

9. The intake air distribution system of claim 8 wherein the manifold includes an undulating surface that is interlaced with the undulating portion of the air filter screen, such that a crest of the undulating surface is aligned with a trough of the undulating portion and a trough of the undulating surface is aligned with a crest of the undulating portion.

10. The intake air distribution system of claim 5 wherein the manifold includes perforations that register with the side wall and the circular wall of the air filter screen.

11. An intake air distribution system for an agricultural vehicle, the intake air distribution system comprising:
    an air filter screen having walls defining an interior space, the walls of the air filter screen including a circular wall defining a longitudinal axis and a side wall extending from a circumference of the circular wall, wherein the side wall of the air filter screen includes an undulating portion;
    an air blower positioned within the interior space of the air filter screen, the air blower including an inlet positioned adjacent the circular wall of the air filter screen to draw air in through the air filter screen and an outlet through which air is exhausted from the blower; and
    a manifold extending from the outlet of the blower for exhausting air through the walls of the air filter screen to remove contamination from the air filter screen, the manifold including:
       an undulating surface that is interlaced with the undulating portion of the air filter screen, such that a crest of the undulating surface is aligned with a trough of the undulating portion and a trough of the undulating surface is aligned with a crest of the undulating portion; and
       perforations that register with the side wall and the circular wall of the air filter screen.

12. The intake air distribution system of claim 11, further comprising a drive system for rotating the air filter screen relative to the manifold.

13. The intake air distribution system of claim 11 further comprising a panel to which the air filter screen is rotatably mounted.

14. The intake air distribution system of claim 13 further comprising a guide roller mounted to the panel, wherein the air filter screen is mounted to the guide roller such that the air filter screen can rotate on the guide roller.

15. An intake air distribution system for removing contamination from an air filter screen having walls defining an interior space, the intake air distribution system comprising:
    an air blower positioned within the interior space of the air filter screen, the air blower including an inlet positioned to draw air in through the air filter screen and an outlet through which air is exhausted from the blower;
    a manifold extending from the outlet of the blower for directing air onto the walls of the air filter screen and out through the air filter screen, the manifold including perforations that register with the side wall and the circular wall of the air filter screen; and
    a drive system for rotating the air filter screen relative to the manifold, the drive system including a belt connected to the air filter screen for rotating the screen relative to the manifold.

* * * * *